(12) United States Patent
Takahashi (10) Patent No.: US 6,913,282 B2
(45) Date of Patent: Jul. 5, 2005

(54) HEAD-PROTECTION AIRBAG DEVICE

(75) Inventor: Hiroyuki Takahashi, Nishikamo-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/727,556

(22) Filed: Dec. 5, 2003

(65) Prior Publication Data

US 2004/0080145 A1 Apr. 29, 2004

Related U.S. Application Data

(62) Division of application No. 09/935,597, filed on Aug. 24, 2001, now Pat. No. 6,705,640.

(30) Foreign Application Priority Data

Aug. 28, 2000 (JP) ...................................... 2000-257682
Aug. 28, 2000 (JP) ...................................... 2000-257795

(51) Int. Cl.[7] ........................... B60R 21/22; B60R 21/16
(52) U.S. Cl. ................................... 280/730.2; 280/742
(58) Field of Search .......................... 280/730.2, 729, 280/740, 742

(56) References Cited

U.S. PATENT DOCUMENTS

| | | | |
|---|---|---|---|
| 5,906,395 | A | 5/1999 | Isaji et al. |
| 6,010,149 | A | 1/2000 | Riedel et al. |
| 6,073,961 | A | 6/2000 | Bailey et al. |
| 6,168,191 | B1 | 1/2001 | Webber et al. |
| 6,237,941 | B1 | 5/2001 | Bailey et al. |
| 6,244,619 | B1 | 6/2001 | Satzger |
| 6,260,878 | B1 | 7/2001 | Tanase |
| 6,296,272 | B1 | 10/2001 | Heigl |
| 6,367,836 | B1 | 4/2002 | Tanase et al. |
| 6,378,895 | B1 | 4/2002 | Brucker et al. |
| 6,450,529 | B1 | 9/2002 | Kalandek et al. |
| 6,457,740 | B1 | 10/2002 | Vaidyaraman et al. |
| 6,471,240 | B2 | 10/2002 | Bakhsh et al. |

FOREIGN PATENT DOCUMENTS

| | | |
|---|---|---|
| EP | 0 904 992 A2 | 3/1999 |
| EP | 0 950 578 A2 | 10/1999 |
| EP | 0 957 010 A2 | 11/1999 |
| EP | 0 967 126 A1 | 12/1999 |
| EP | 0 980 796 A2 | 2/2000 |
| JP | 9-249089 | 9/1997 |
| JP | 11-48901 A | 2/1999 |
| JP | A 11-091490 | 4/1999 |
| JP | A 11-235965 | 8/1999 |
| JP | A 11-301394 | 11/1999 |
| JP | A 11-314555 | 11/1999 |
| JP | A 11-321538 | 11/1999 |
| JP | A 2000-118346 | 4/2000 |
| JP | A 2000-127885 | 5/2000 |
| JP | A 2000-127886 | 5/2000 |
| JP | A 2001-055109 | 2/2001 |
| JP | A 2001-063513 | 3/2001 |
| JP | A 2001-080446 | 3/2001 |
| JP | A 2001-213263 | 8/2001 |
| JP | A 2002-46567 | 2/2002 |
| JP | A 2002-037008 | 2/2002 |
| JP | A 2003-502203 | 1/2003 |
| WO | WO 98/22313 | 5/1998 |
| WO | WO 99/19172 | 4/1999 |
| WO | WO 99/42333 | 8/1999 |

OTHER PUBLICATIONS

U.S. Appl. No. 10/727,529, filed Dec. 5, 2003.

*Primary Examiner*—Ruth Ilan (57) ABSTRACT

The head-protection airbag device comprises an airbag stored along a roof side rail and including a gas-introducing path at its upper edge. A gas is supplied from a gas supplier into an inflation chamber through a gas distribution pipe provided within the gas-introducing path, whereby the airbag is inflated and deployed like a curtain along a sidewall of a vehicle compartment so as to protect a head of an occupant. Gas outlets of the gas distribution pipe are oriented in different directions in a region corresponding to a door glass portion and in a region corresponding to a pillar garnish portion.

4 Claims, 11 Drawing Sheets

HEAD-PROTECTION AIRBAG DEVICE

INCORPORATION BY REFERENCE

This is a Divisional of application Ser. No. 09/935,597 filed on Aug. 24, 2001, now U.S. Pat. No. 6,705,640. The entire disclosure of the prior application, including the specification, drawings, and abstract are incorporated herein by reference in its entirety.

BACKGROUND OF THE INVENTION

1. Field of the Invention

The invention relates to a head-protection airbag device mounted in vehicles.

2. Description of Related Art

This type of head-protection airbag devices includes a head-protection airbag device in which an airbag stored along a roof side rail has a gas-introducing path at its upper edge. A gas is supplied from a gas supplier into an inflation chamber through a gas distribution pipe provided within the gas-introducing path, whereby the airbag is inflated and deployed like a curtain along the sidewall of the vehicle compartment so as to protect a head of an occupant. Such a head-protection airbag device is described in, e.g., International Publication No. 98/22313 and Japanese Laid-Open Publication Nos. 11-301394 and 11-314555.

In the aforementioned conventional head-protection airbag device, gas outlets of the gas distribution pipe are oriented in the same direction with respect to the inflation chamber of the airbag. It is therefore impossible to deploy each portion of the airbag (e.g., the portions respectively corresponding to a door glass portion and a pillar garnish portion) in an optimal direction. Moreover, a reduction in the time for completion of deployment of the airbag has been required in such a head-protection airbag device. Thus, there is a need for an improved head-protection airbag device in these respects.

SUMMARY OF THE INVENTION

A head-protection airbag device according to a first aspect of the invention includes an airbag stored along a roof side rail and including a gas-introducing path at its upper edge. A gas is supplied from a gas supplier into an inflation chamber through a gas distribution pipe provided within the gas-introducing path, whereby the airbag is inflated and deployed like a curtain along a sidewall of a vehicle compartment so as to protect a head of an occupant. Gas outlets in the gas distribution pipe are opened in different directions depending on a region of the air bag.

According to the first aspect of the invention, the airbag is normally stored along the roof side rail in a folded state. Upon side impact, rollover or the like of a vehicle, the gas is supplied from the gas supplier through the gas distribution pipe into the inflation chamber of the airbag, whereby the airbag is inflated and deployed like a curtain along the sidewall of the vehicle compartment. At this time, with the gas supplied from the gas supplier, an inflatable portion of the airbag is inflated and deployed toward a head-protection inflation area that is located laterally to the head of the occupant. The gas outlets in the gas distribution pipe are opened in different directions depending on a region of the airbag. This enables each part of the airbag to be deployed in a desired direction, whereby the deployment direction can be optimized for each part of the airbag.

In the first aspect of the invention, the gas outlets may be opened in different directions according to a resistance of an interior member against deployment of the airbag. Accordingly, each gas outlet corresponding to a region that is subjected to a large resistance against deployment of the airbag may be opened toward that region in order to supply a large amount of gas thereto. On the other hand, each gas outlet corresponding to a region that is subjected to a small resistance against deployment of the airbag may be opened away from that region in order to supply a small amount of gas thereto. This enables approximately uniform deployment of the airbag, allowing a reduction in the deployment time of the airbag.

In the first aspect of the invention, the gas outlets may be opened in different directions in a region corresponding to a door glass portion and in a region corresponding to a pillar garnish portion. This enables the gas to be accurately supplied to the respective regions of the airbag corresponding to the door glass portion and the pillar garnish portion, allowing for improvement in inflation/deployment capability of the airbag.

In the aforementioned aspect of the invention, the gas outlet in the region corresponding to the door glass portion may be opened in a direction that crosses a door glass plane, and the gas outlet in the region corresponding to the pillar garnish portion may be opened in a direction over a pillar garnish. Accordingly, the airbag can be deployed along, and in contact with, the door glass plane in the region corresponding to the door glass portion. This enables the airbag to be accurately interposed between the door glass portion and the head of the occupant even if there is only a small space therebetween. Moreover, in the region corresponding to the pillar garnish portion, the airbag can be deployed in the direction over the pillar garnish. This can prevent the airbag from being hooked at the pillar garnish.

A head-protection airbag device according to a second aspect of the invention includes an airbag stored along a roof side rail and including a gas-introducing path at its upper edge. A gas is supplied from a gas supplier into a plurality of inflation chambers of the airbag through a plurality of gas outlets of a gas distribution pipe provided within the gas-introducing path, whereby the airbag is inflated and deployed like a curtain along a sidewall of a vehicle compartment so as to protect a head of a seated occupant. The gas outlets of the gas distribution pipe are disposed corresponding only to predetermined inflation chambers.

A head-protection airbag device according to a third aspect of the invention includes an airbag stored along a roof side rail and including a gas-introducing path at its upper edge. A gas is supplied from a gas supplier into a plurality of inflation chambers of the airbag through the gas-introducing path, whereby the airbag is inflated and deployed like a curtain along a sidewall of a vehicle compartment so as to protect a head of an occupant. The gas-introducing path communicates only with predetermined inflation chambers.

In the head-protection airbag device according to the second and third aspects of the invention, upon side impact, rollover or the like of the vehicle, the gas is supplied from the gas supplier into the inflation chambers of the airbag, whereby the airbag is inflated and deployed like a curtain along the sidewall of the vehicle compartment. At this point, only the predetermined inflation chambers of the airbag can receive the gas from an early stage. Accordingly, the predetermined inflation chambers can be inflated and deployed quickly. This enables deployment of the airbag (curtain-like deployment) to be completed before a sufficient amount of gas flows into every inflation chamber of the airbag, allowing a reduction in the time for completion of deployment of the airbag.

In each of the aforementioned aspects of the invention, the predetermined inflation chambers may have a smaller volume than that of the remainder. Thus, the predetermined inflation chambers can be inflated and deployed with a smaller amount of gas, allowing a further reduction in the time for completion of deployment of the airbag.

In each of the aforementioned aspects of the invention, the predetermined inflation chambers may be disposed at locations away from the head of the seated occupant in a fore-and-aft direction of the vehicle. Accordingly, the airbag can be deployed with an inflation chamber at a location corresponding to the head of the seated occupant being insufficiently inflated. This enables the airbag to be accurately interposed between the sidewall of the vehicle compartment and the head of the seated occupant even if there is only a small space therebetween.

DETAILED DESCRIPTION OF THE PREFERRED EMBODIMENTS

Hereinafter, a first embodiment of the invention will be described in conjunction with the drawings. A head-protection airbag device 10 of the invention shown FIGS. 1 and 2 includes an airbag 11 inflated and deployed like a curtain along the sidewall of the vehicle compartment so as to protect the head of the occupant seated in a front seat S1 (the seat corresponding to a B pillar 23) and the head of the occupant seated in a rear front seat S2 (the seat corresponding to a C pillar 24), an inflator 12 serving as a gas supplier for supplying a gas to the airbag 11, and a gas distribution pipe 13 for distributing the gas supplied from the inflator 12 to each inflation chamber R1 to R7 of the airbag 11.

Figure 1:
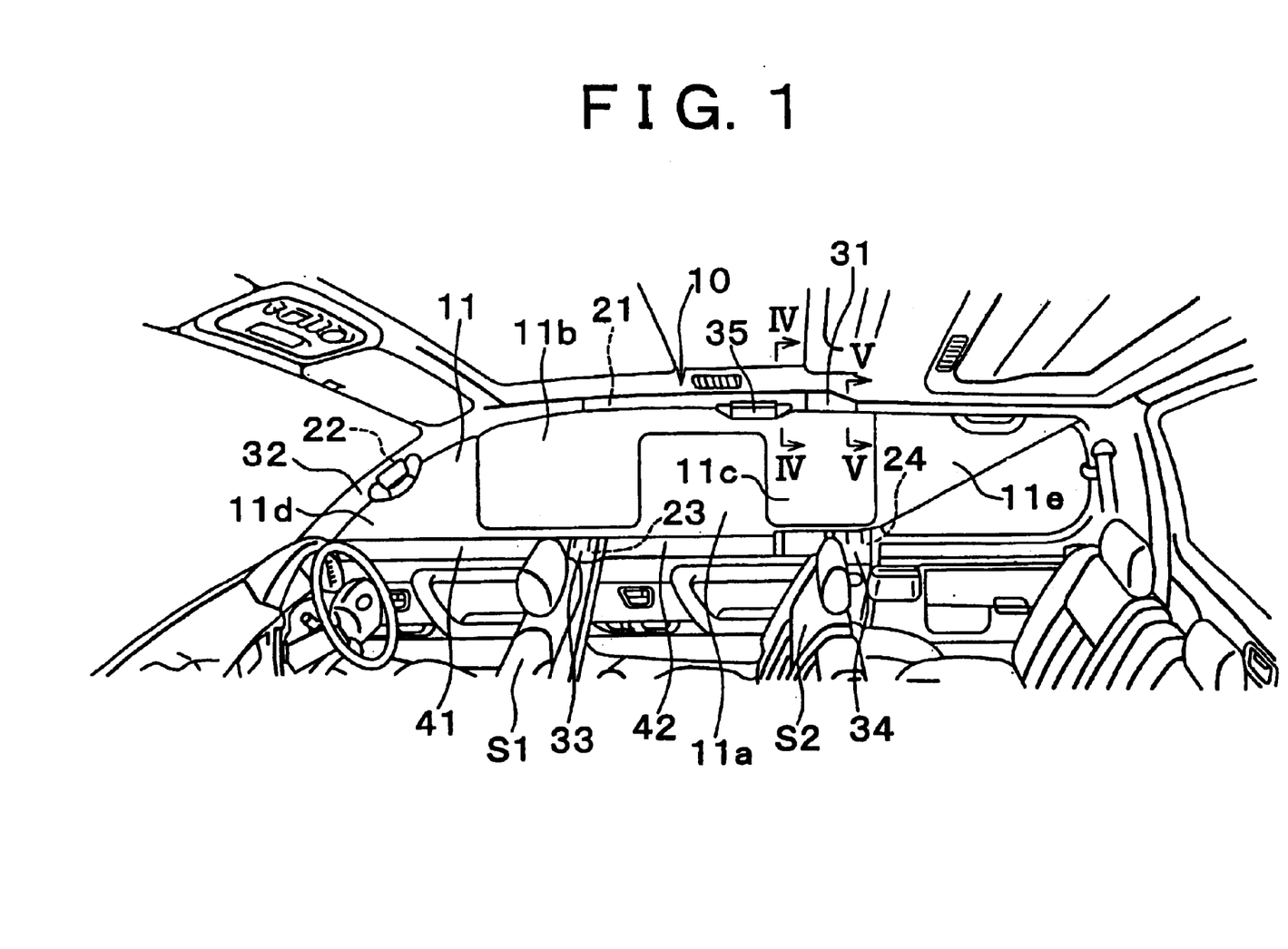
FIG. 1 is a side view showing a first embodiment of a head-protection airbag device according to the invention.
Figure 2:
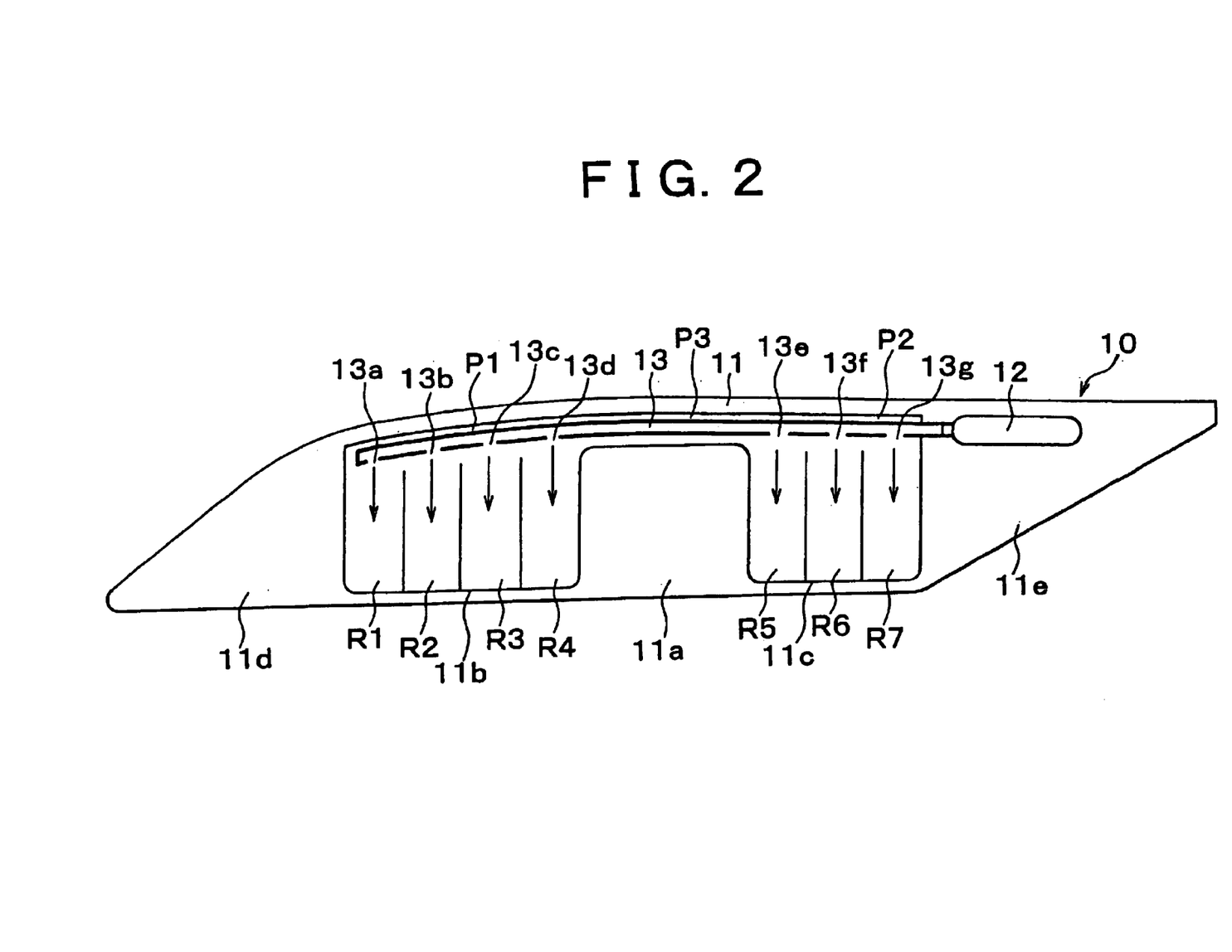
FIG. 2 is an enlarged side view of the head-protection airbag device shown in FIG. 1.

The airbag 11 is formed from foundation cloth (woven fabric) having an airtight coating thereon (the airtight coating may be omitted). As shown in FIGS. 1 and 2, the airbag 11 has a front-seat inflatable portion 11b and a rear-seat inflatable portion 11c with a central non-inflatable portion 11a interposed therebetween. The airbag 11 also has a non-inflatable portion 11d adjacent to the front-seat inflatable portion 11b toward the front of the vehicle, and a non-inflatable portion 11e adjacent to the rear-seat inflatable portion 11c toward the rear of the vehicle. The airbag 11 is attached to a roof side rail 21 and an A pillar (front pillar) 22 by a plurality of attachment members (not shown) provided along its upper edge.

The front-seat inflatable portion 11b is inflated and deployed so as to laterally protect the head of the occupant in the front seat. The front-seat inflatable portion 11b has four inflation chambers R1 to R4 and a gas-introducing path P1 that allows the inflation chambers R1 to R4 to communicate with each other at its upper edge. The rear-seat inflatable portion 11c is inflated and deployed so as to laterally protect the head of the occupant in the rear front seat. The rear-seat inflatable portion 11c has three inflation chambers R5 to R7 and a gas-introducing path P2 that allows the inflation chambers R5 to R7 to communicate with each other at its upper edge. The rear gas-introducing path P2 is opened at its rear end, and communicates at its front end with the front gas-introducing path P1 through a central gas-introducing path P3.

The airbag 11 with such a structure is stored along the A pillar 22 and the roof side rail 21 in an entirely folded state in preparation for deployment. For example, the airbag 11 is entirely accordion-folded or roll-folded (combination of both folding methods may be used). The airbag 11 thus folded is stored with its lower edge being covered by an elastically deformable A pillar garnish 32 and the periphery of an elastically deformable roof head lining 31.

The inflator 12 ejects a gas into the airbag 11 upon side impact, rollover or the like of the vehicle. The inflator 12 is provided along the roof side rail 21. More specifically, the inflator is attached to the roof side rail 21 by using a bracket and a bolt (both of which are not shown). The front end of the inflator 12 is hermetically connected to the gas distribution pipe 13. The inflator 12 and the rear end of the gas distribution pipe 13 are covered by the periphery of the roof head lining 31.

Figure 3:
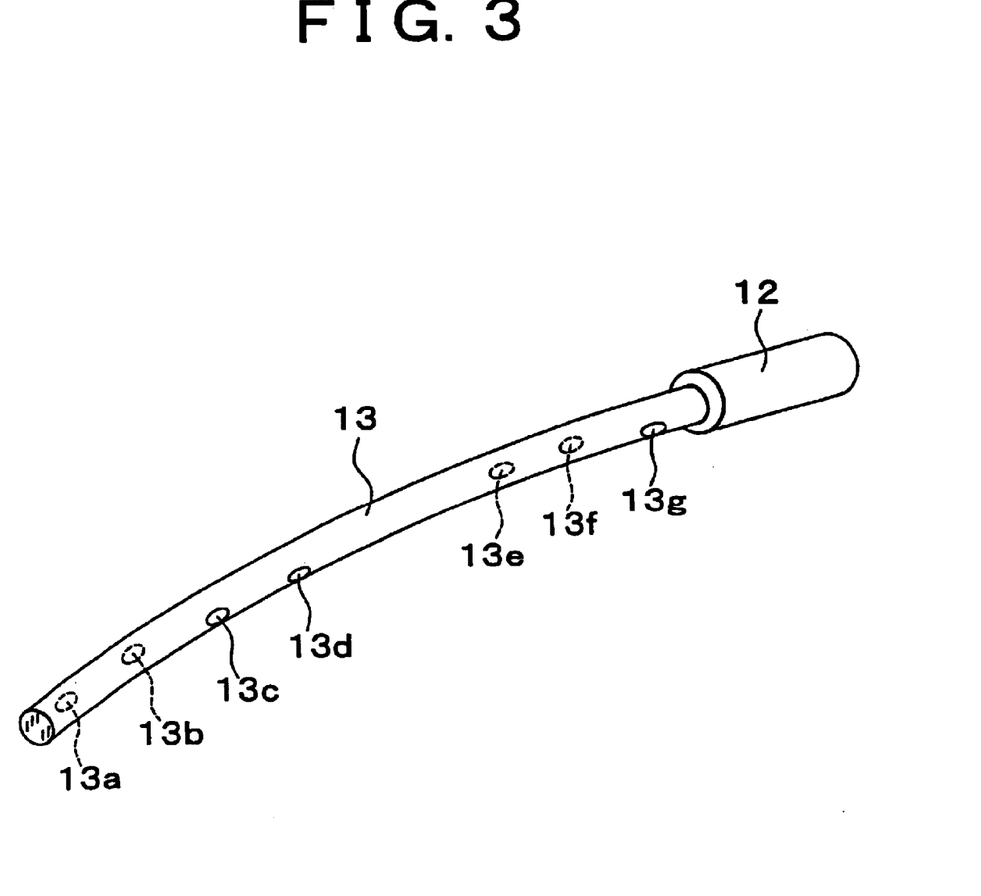
FIG. 3 is an enlarged perspective view of an inflator and a gas distribution pipe shown in FIGS. 1 and 2.

As shown in FIGS. 2 and 3, the gas distribution pipe 13 is closed at its front end and is hermetically connected to the inflator 12 at its rear end. The gas distribution pipe 13 extends through the gas-introducing paths P1, P2 and P3 via the opening at the rear end of the rear gas-introducing path P2, and is hermetically sealed at this opening. The gas distribution pipe 13 has gas outlets 13a to 13g respectively corresponding to the inflation chambers R1 to R7 of the airbag 11.

The gas outlets 13a, 13b and 13e, 13f are respectively opened to the inflation chambers R1, R2 corresponding to a front door glass portion 41 and the inflation chambers R5, R6 corresponding to a central door glass portion 42. As exemplarily shown in FIG. 4, the gas outlet 13e is opened in the direction that crosses the door glass plane G (see the direction shown by the arrow in FIG. 4). The other gas outlets 13a, 13b and 13f are also opened in the same direction.

Figure 5:
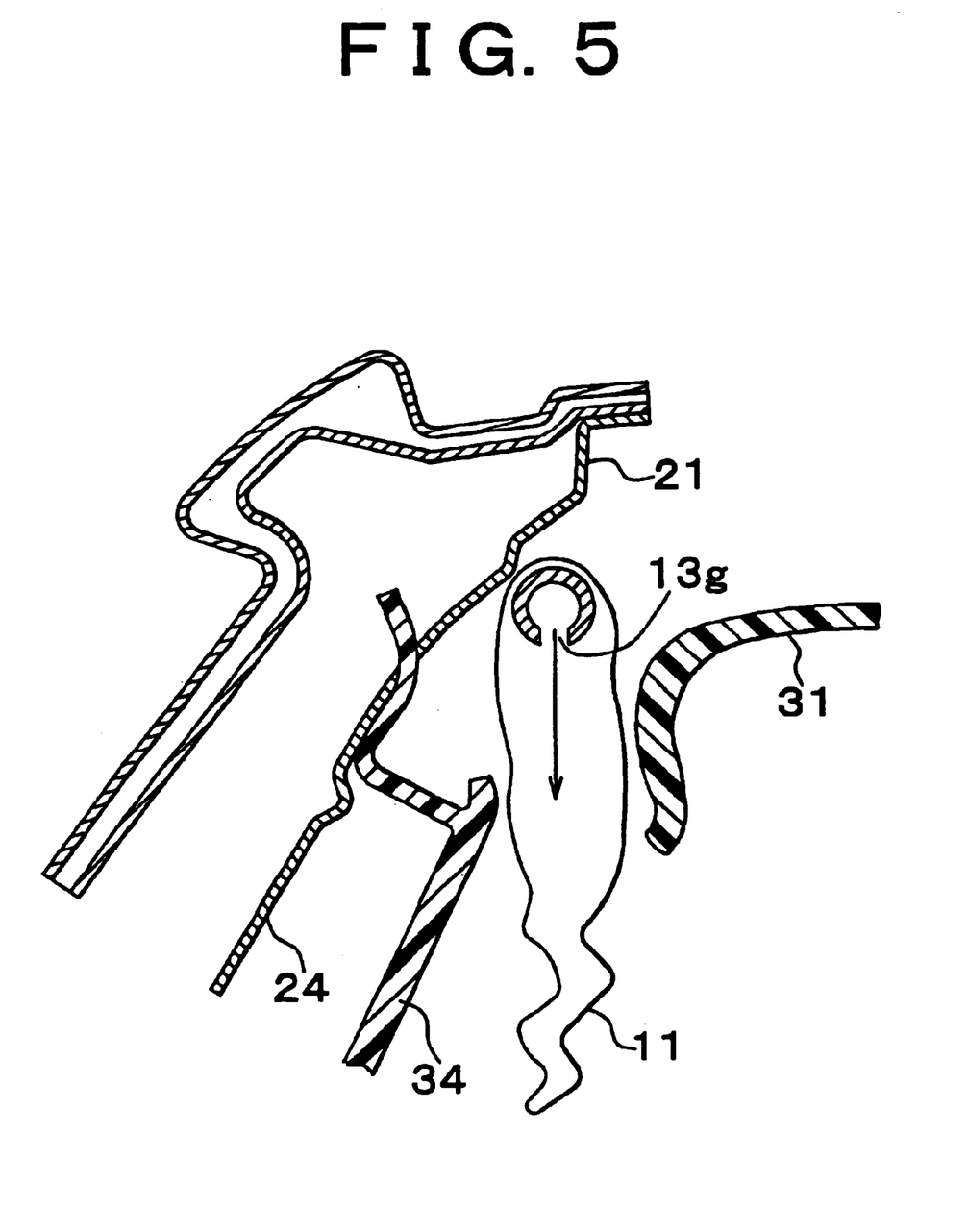
FIG. 5 is an enlarged cross-sectional view taken along the line V—V of FIG. 1.

On the other hand, the gas outlets 13c, 13d and 13g are respectively opened to the inflation chambers R3, R4 corresponding to a B pillar garnish 33 and the inflation chamber R7 corresponding to a C pillar garnish 34. As exemplarily shown in FIG. 5, the gas outlet 13g is opened in the direction over the C pillar garnish 34 (see the direction shown by the arrow in FIG. 5). The other gas outlets 13c and 13d are also opened in the direction over the B pillar garnish 33.

In such a head-protection airbag device 10 of this embodiment, the airbag 11 is normally stored along the A pillar 22 and the roof side rail 21 in an entirely folded state and is covered by the A pillar garnish 32 and the periphery of the roof head lining 31.

Upon side impact, rollover or the like of the vehicle, the inflator 12 ejects a gas. The gas thus ejected is supplied through the gas distribution pipe 13 into each inflation chamber R1 to R7 of the airbag 11 stored in a folded state. As a result, the airbag 11 is deployed downward while deforming the respective corresponding portions of the roof head lining 31 and the A pillar garnish 32 into the vehicle compartment. The airbag 11 is thus inflated and deployed like a curtain along the sidewall of the vehicle compartment, as shown in FIG. 1. At this point, the inflatable portions 11b, 11c of the airbag 11 are inflated and deployed toward respective head-protection inflation areas that are located laterally to the heads of the front and rear occupants.

In this embodiment, the gas outlets 13a to 13g of the gas distribution pipe 13 are oriented in different directions depending on a region of the airbag. More specifically, the gas outlets of the regions corresponding to the door glass portions 41, 42 (the regions where the inflation chambers R1, R2 and R5, R6 of the air bag 11 are provided, respectively) are oriented in the direction different from that of the gas outlets of the regions corresponding to the pillar garnish portions 33, 34 (the regions where the inflation chambers R3, R4 and R7 of the airbag 11 are provided, respectively). In the regions corresponding to the door glass portions 41, 42, the gas outlets 13a, 13b and 13e, 13f of the gas distribution pipe 13 are opened in the direction that crosses the door glass plane G.

Figure 4:
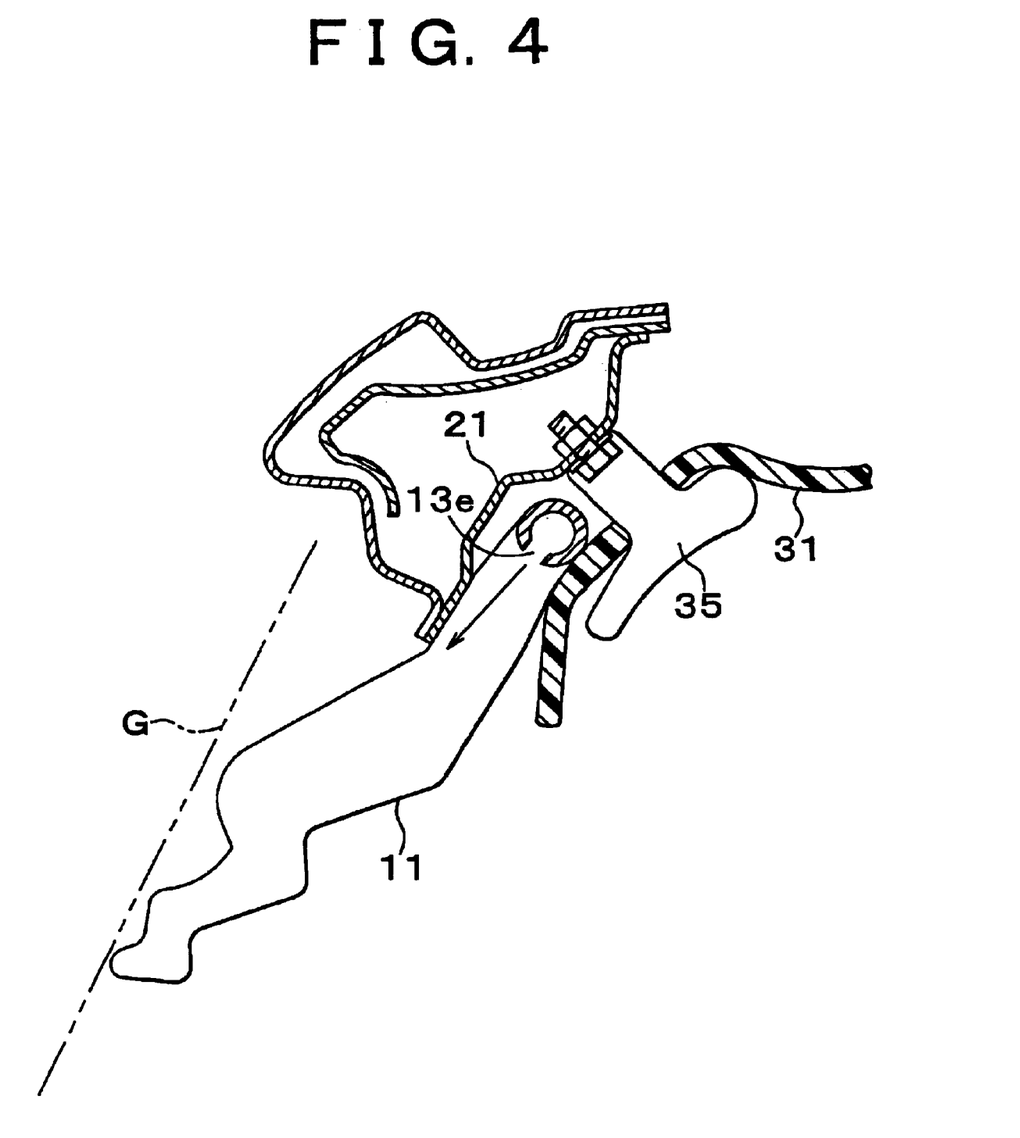
FIG. 4 is an enlarged cross-sectional view taken along the line IV—IV of FIG. 1.

Accordingly, in the regions corresponding to the door glass portions 41, 42, the airbag 11 can be deployed along, and in contact with, the door glass plane Q as exemplarily shown in FIG. 4. This enables the airbag 11 to be accurately interposed between each door glass portion 41, 42 and the head of each occupant even if there is only a small space therebetween. Moreover, in the regions corresponding to the pillar garnish portions 33, 34, the airbag 11 can be deployed in the direction over the pillar garnish 33, 34, as exemplarily shown in FIG. 5. This can prevent the airbag 11 from partially entering the gap between the upper end of the pillar garnish 33, 34 and the pillar 23, 24 upon deployment, and from being hooked at the pillar garnish 33, 34.

Figure 6:
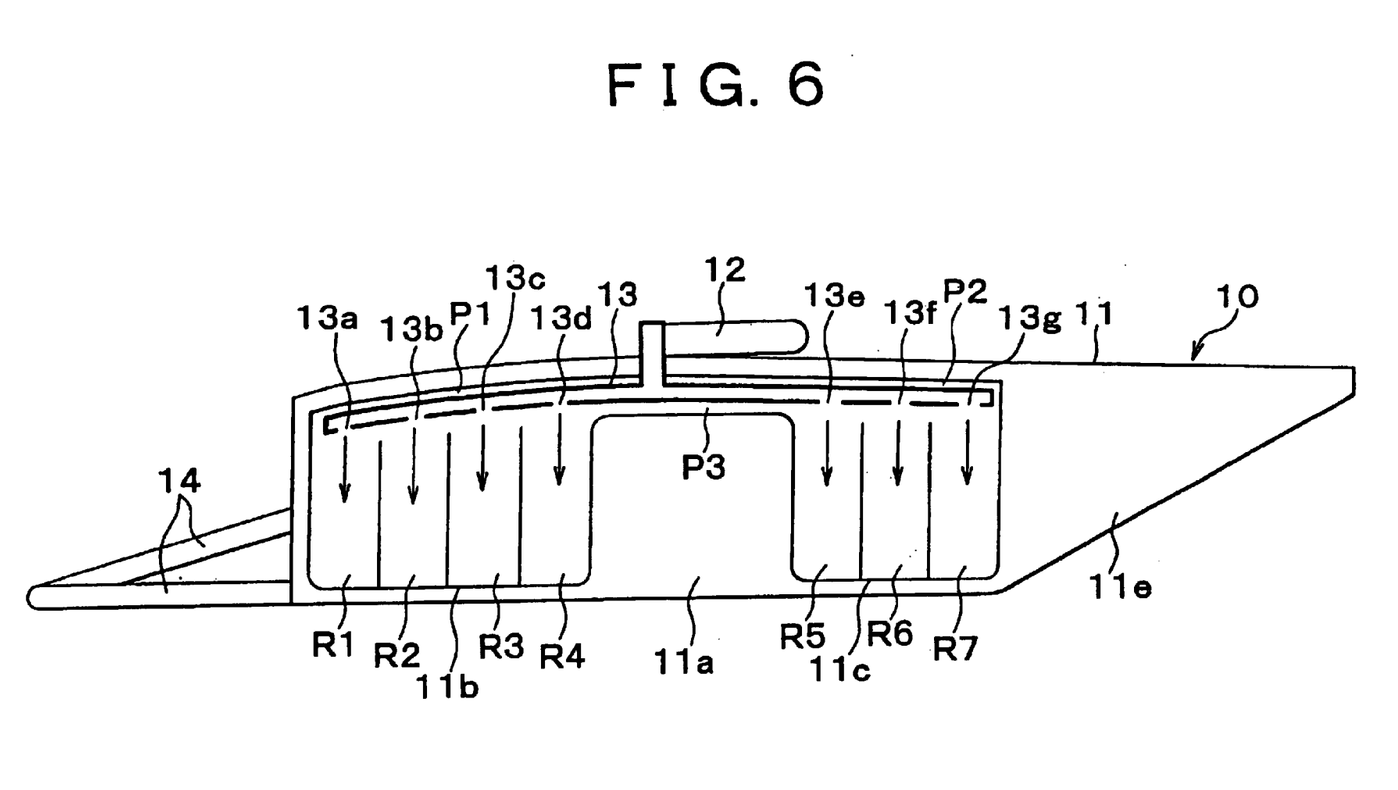
FIG. 6 is a side view corresponding to FIG. 2, showing a second embodiment of the head-protection airbag device according to the invention.

In the first embodiment, the inflator 12 is provided at the rear end of the gas distribution pipe 13. As in a second embodiment of the invention shown in FIG. 6, however, the inflator 12 may alternatively be provided at an intermediate position of the gas distribution pipe 13. In this case, the gas can be rapidly and approximately simultaneously supplied from the inflator 12 into each inflatable portion 11b, 11c of the airbag 11, allowing a reduction in the inflation and deployment time of both inflatable portions 11b, 11c. Note that, in the modification of FIG. 6, the front non-inflatable portion 11d of the airbag 11 is replaced with a tension belt 14.

In the first embodiment, the gas outlets 13a, 13b and 13e, 13f of the gas distribution pipe 13 are opened in the direction that crosses the door glass plane G, whereas the gas outlets 13c, 13d and 13g are opened in the direction over the corresponding pillar garnish 33, 34. According to the invention, however, the gas outlets of the gas distribution pipe need only be opened in different directions depending on a region of the airbag. For example, the gas outlets may be oriented in different directions according to the resistance of the interior members against deployment of the airbag (the roof head lining 31 has an increased deployment resistance by an assist grip 35, as shown in FIG. 4).

Orienting the gas outlets of the gas distribution pipe in different directions depending on a region of the airbag enables each part of the airbag to be deployed in a desired direction, whereby the deployment direction can be optimized for each part of the airbag. In the case where the gas outlets are oriented in different directions according to the resistance of the interior members against deployment of the airbag (the gas outlets may have different sizes), each gas outlet corresponding to a region that is subjected to a large resistance upon deployment of the airbag may be oriented to that region in order to supply a large amount of gas thereto. On the other hand, each gas outlet corresponding to a region that is subjected to a small resistance upon deployment of the airbag may be oriented away from that region in order to supply a small amount of gas thereto. This enables approximately uniform deployment of the airbag, allowing a reduction in the deployment time of the airbag.

Figure 7:
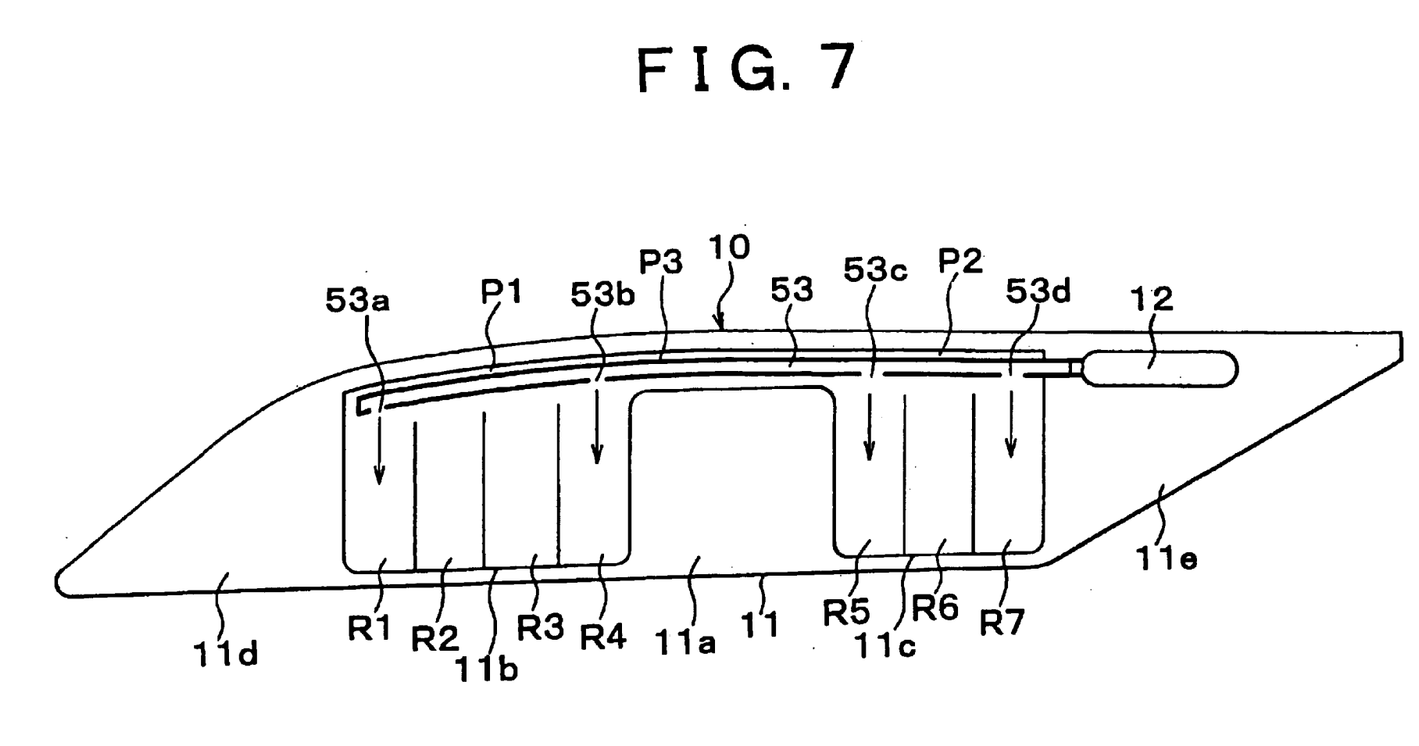
FIG. 7 is an enlarged side view showing the main part of a third embodiment of the head-protection airbag device according to the invention.

Hereinafter, a third embodiment of the invention will be described with reference to FIG. 7. Note that, in the following description, the same components as those of the first embodiment are denoted with the same reference numerals and characters, and detailed description thereof will be omitted.

In the third embodiment of the invention, a gas distribution pipe 53 is closed at its front end and is hermetically connected to the inflator 12 at its rear end. The gas distribution pipe 53 extends through the gas-introducing paths P1, P2 and P3 via the opening at the rear end of the rear gas-introducing path P2, and is hermetically sealed at this opening. The gas distribution pipe 53 includes gas outlets 53a, 53b corresponding to the front-seat inflatable portion 11b of the airbag 11, and gas outlets 53c, 53d corresponding to the rear-seat inflatable portion 11c.

The gas outlets 53a and 53b respectively correspond to the inflation chambers R1 and R4 which are disposed at the locations away from the head of the occupant in the front seat in the fore-and-aft direction of the vehicle. The gas outlets 53a and 53b are respectively opened toward the bottom of the inflation chambers R1 and R4, so that they can supply a gas to the respective inflation chambers R1 and R4. Note that part of the gas supplied to the inflation chambers R1 and R4 can be supplied to the inflation chambers R2 and R3 through the front gas-introducing path P1.

On the other hand, the gas outlets 53c and 53d respectively correspond to the inflation chambers R5 and R7 which are disposed at the locations away from the head of the occupant in the rear front seat in the fore-and-aft direction of the vehicle. The gas outlets 53c and 53d are respectively opened toward the bottom of the inflation chambers R5 and R7, so that they can supply a gas to the respective inflation chambers R5 and R7. Note that part of the gas supplied to the inflation chambers R5 and R7 can be supplied to the inflation chamber R6 through the rear gas-introducing path P2.

In such a head-protection airbag device 10 of the third embodiment, the airbag 11 is normally stored along the A pillar 22 and the roof side rail 21 in an entirely folded state and is covered by the A pillar garnish 32 and the periphery of the roof head lining 31.

Upon side impact, rollover or the like of the vehicle, the inflator 12 ejects a gas. The gas thus ejected is supplied through the gas distribution pipe 53 into each inflation chamber R1 to R7 of the airbag 11 stored in a folded state. As a result, the airbag 11 is deployed downward while deforming the respective corresponding portions of the roof head lining 31 and the A pillar garnish 32 into the vehicle compartment. The airbag 11 is thus inflated and deployed like a curtain along the sidewall of the vehicle compartment, as shown in FIG. 1. At this point, the inflatable portions 11b, 11c of the airbag 11 are inflated and deployed toward respective head-protection inflation areas that are located laterally to the heads of the front and rear occupants.

In the third embodiment, the gas distribution pipe 53 has the gas outlets 53a and 53b respectively corresponding to the inflation chambers R1 and R4 of the airbag 11, and the gas outlets 53c and 53d respectively corresponding to the inflation chambers R5 and R7 of the airbag 11. Accordingly, in the airbag 11 that is inflated and deployed like a curtain along the sidewall of the vehicle compartment, only the predetermined inflation chambers R1, R4 and R5, R7 can receive the gas from an early stage. Accordingly, the predetermined inflation chambers R1, R4 and R5, R7 can be inflated and deployed quickly as compared to the other inflation chambers R2, R3 and R6.

This enables deployment of the airbag 11 (curtain-like deployment) to be completed before a sufficient amount of gas flows into every inflation chamber R1 to R7 of the airbag 11, allowing a reduction in the time between the start of deployment of the airbag 11 and completion thereof (at this point, the airbag 11 is still being inflated).

In the third embodiment, the gas outlets 53a and 53b are provided respectively corresponding to the inflation chambers R1 and R4 that are disposed at the locations away from the head of the occupant in the front seat in the fore-and-aft direction of the vehicle. Moreover, the gas outlets 53c and 53d are provided respectively corresponding to the inflation chambers R5 and R7 that are disposed at the locations away from the head of the occupant in the rear front seat in the fore-and-aft direction of the vehicle. Therefore, the airbag 11 can be deployed with the inflation chambers R2, R3 and R6 at the locations corresponding to the heads of the seated occupants being insufficiently inflated. This enables the airbag 11 to be accurately interposed between the sidewall of the vehicle compartment and the head of each seated occupant even if there is only a small space therebetween.

Figure 8:
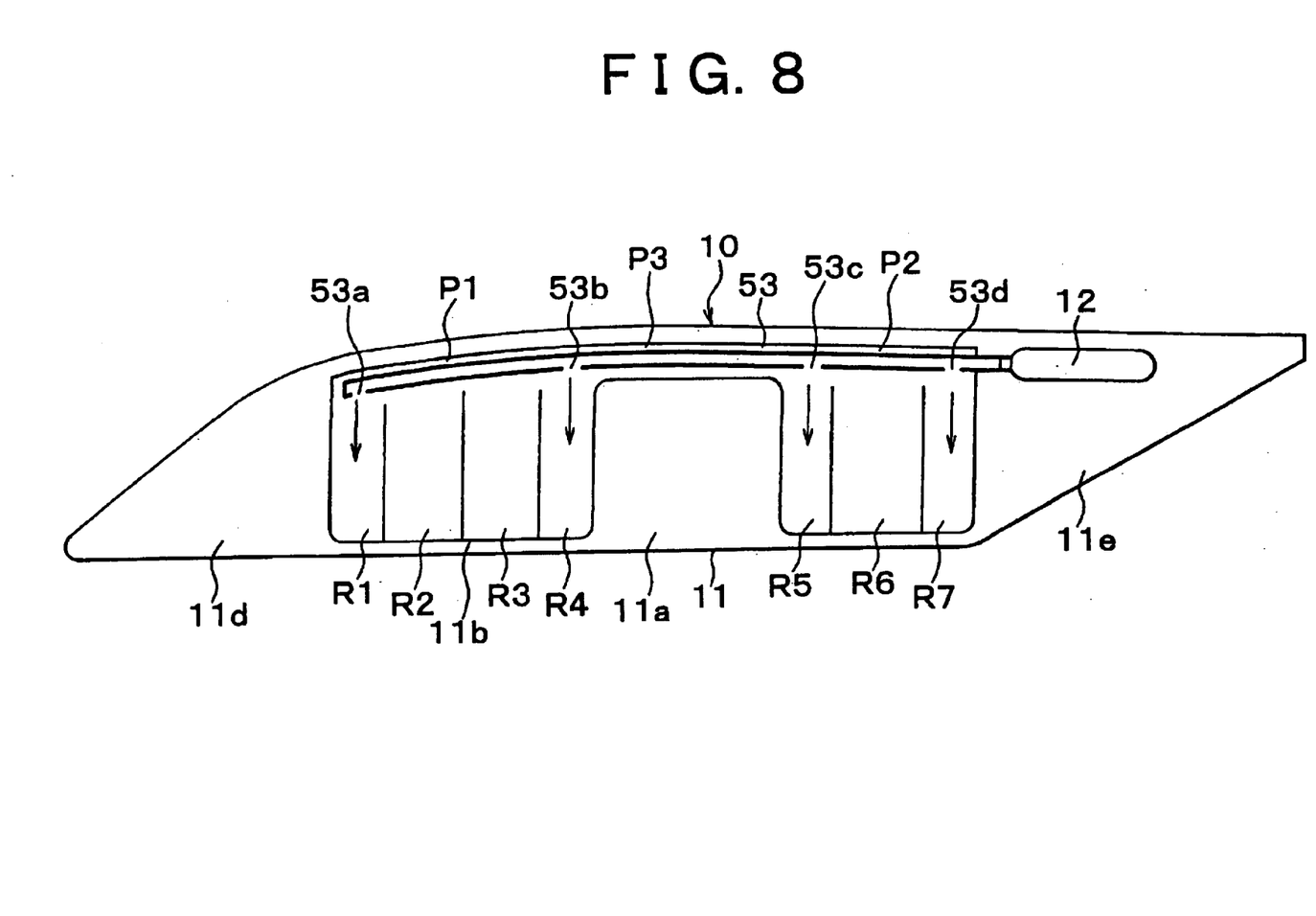
FIG. 8 is an enlarged side view corresponding to FIG. 7, showing the main part of a fourth embodiment of the head-protection airbag device according to the invention.

In the third embodiment, each inflation chamber R1 to R7 of the airbag 11 has approximately the same volume. As in a fourth embodiment of the invention shown in FIG. 8, however, the inflation chambers R1, R4 and R5, R7 corresponding to the gas outlets 53a to 53d of the gas distribution pipe 53 may alternatively have a smaller volume than that of the other inflation chambers R2, R3 and R6. In this case, the inflation chambers R1, R4 and R5, R7 can be inflated and deployed with a smaller amount of gas than that of the above embodiment, allowing a further reduction in the time for completion of deployment of the airbag 11.

Figure 9:
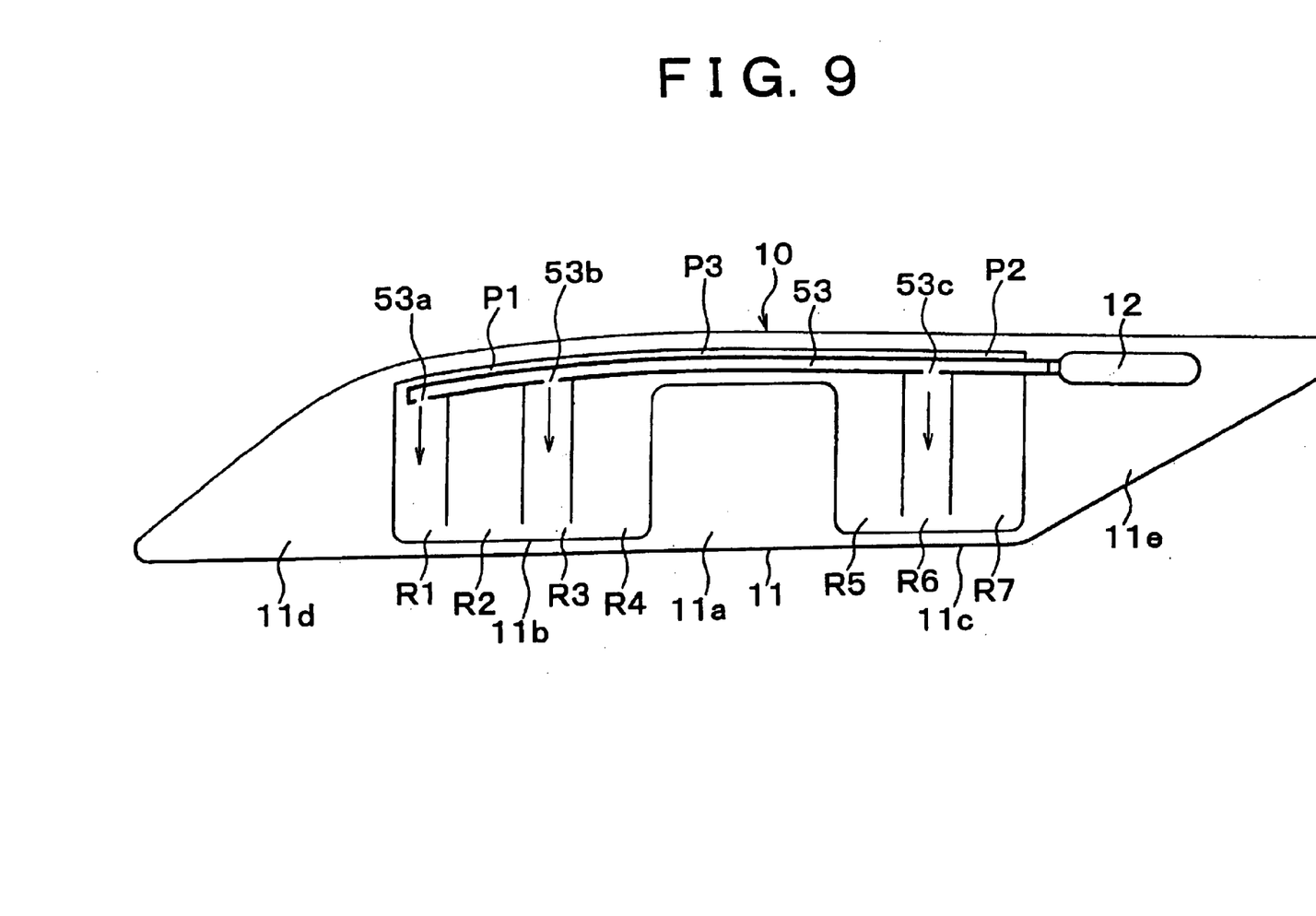
FIG. 9 is an enlarged side view corresponding to FIG. 7, showing the main part of a fifth embodiment of the head-protection airbag device according to the invention.

In the third and fourth embodiments, the gas outlets 53a to 53d of the gas distribution pipe 53 are provided respectively corresponding to the inflation chambers R1, R4 and R5, R7 of the airbag 11. As shown in a fifth embodiment of the invention shown in FIG. 9, however, the gas outlets 53a, 53b and 53c of the gas distribution pipe 53 may alternatively be provided corresponding to the inflation chambers R1, R3 and R6 of the airbag 11, respectively. Note that, in the fifth embodiment of FIG. 9, the inflation chambers R1, R3 and R6 have a smaller volume than that of the other inflation chambers R2, R4 and R5, R7. Moreover, in the fifth embodiment of FIG. 9, the inflation chambers R1 to R4 and the inflation chambers R5 to R7 each communicate with each other at their respective lower ends.

In each of the above embodiments, the inflator 12 may supply a gas to each inflation chamber R1 to R7 of the airbag 11 through the gas distribution pipe 53 extending through the gas-introducing paths P1 to P3 of the airbag 11. As in a sixth embodiment of the invention shown in FIG. 10, however, the gas distribution pipe 53 may be eliminated so that the inflator 12 supplies a gas to each inflation chamber R1 to R7 of the airbag 11 through the gas-introducing paths P1 to P3 of the airbag 11.

Figure 10:
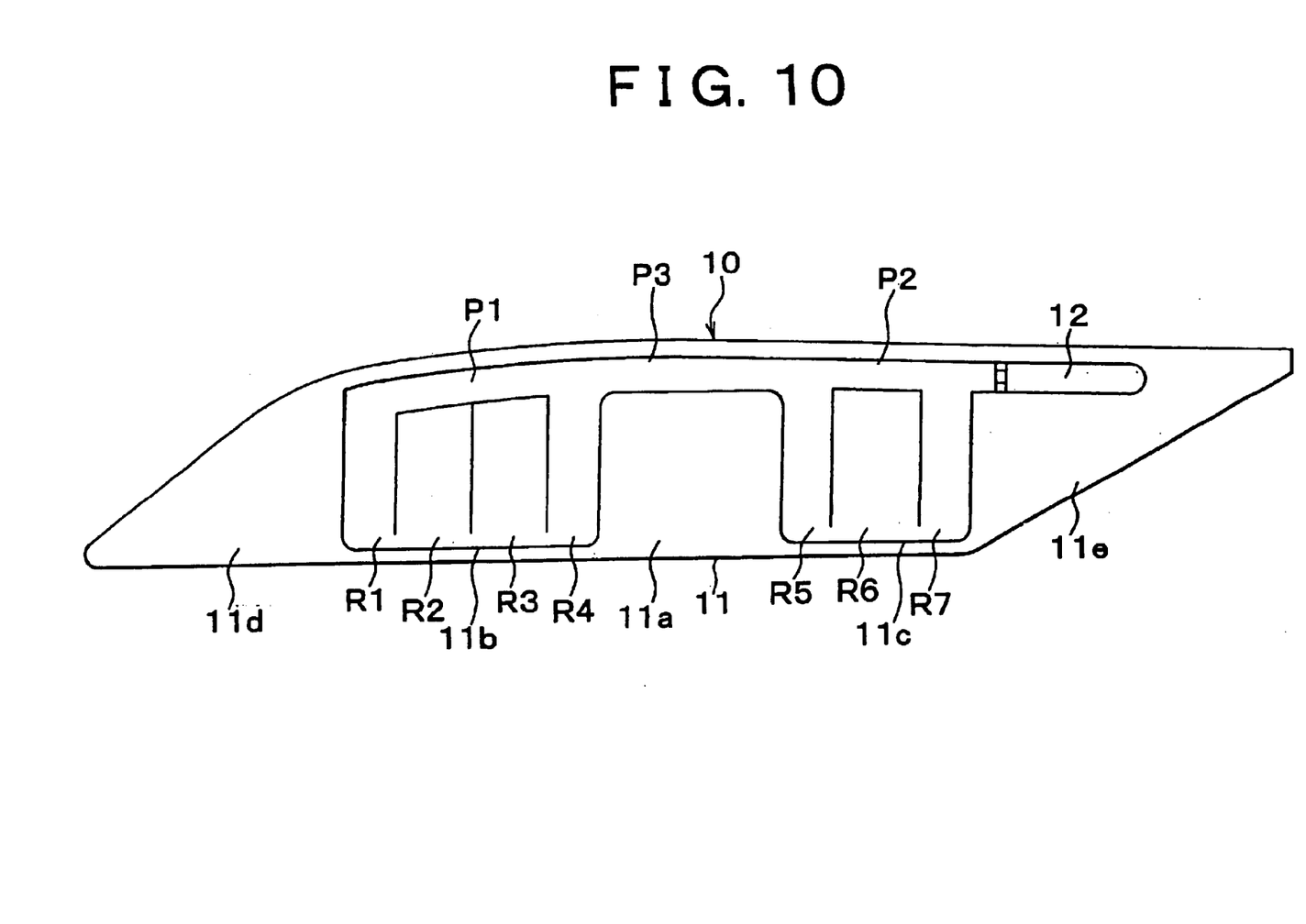
FIG. 10 is an enlarged side view corresponding to FIG. 7, showing the main part of a sixth embodiment of the head-protection airbag device according to the invention.

Note that, in the sixth embodiment of FIG. 10, the inflation chambers R1 and R4 communicate with the gas-introducing path P1, and the inflation chambers R5 and R7 communicate with the gas-introducing path P2. Moreover, the inflation chambers R1 to R4 and the inflation chambers R5 to R7 each communicate with each other at their respective lower ends. In the sixth embodiment of FIG. 10, the inflator 12 is hermetically attached to the rear end of the rear gas-introducing path P2 in the airbag 11.

Figure 11:
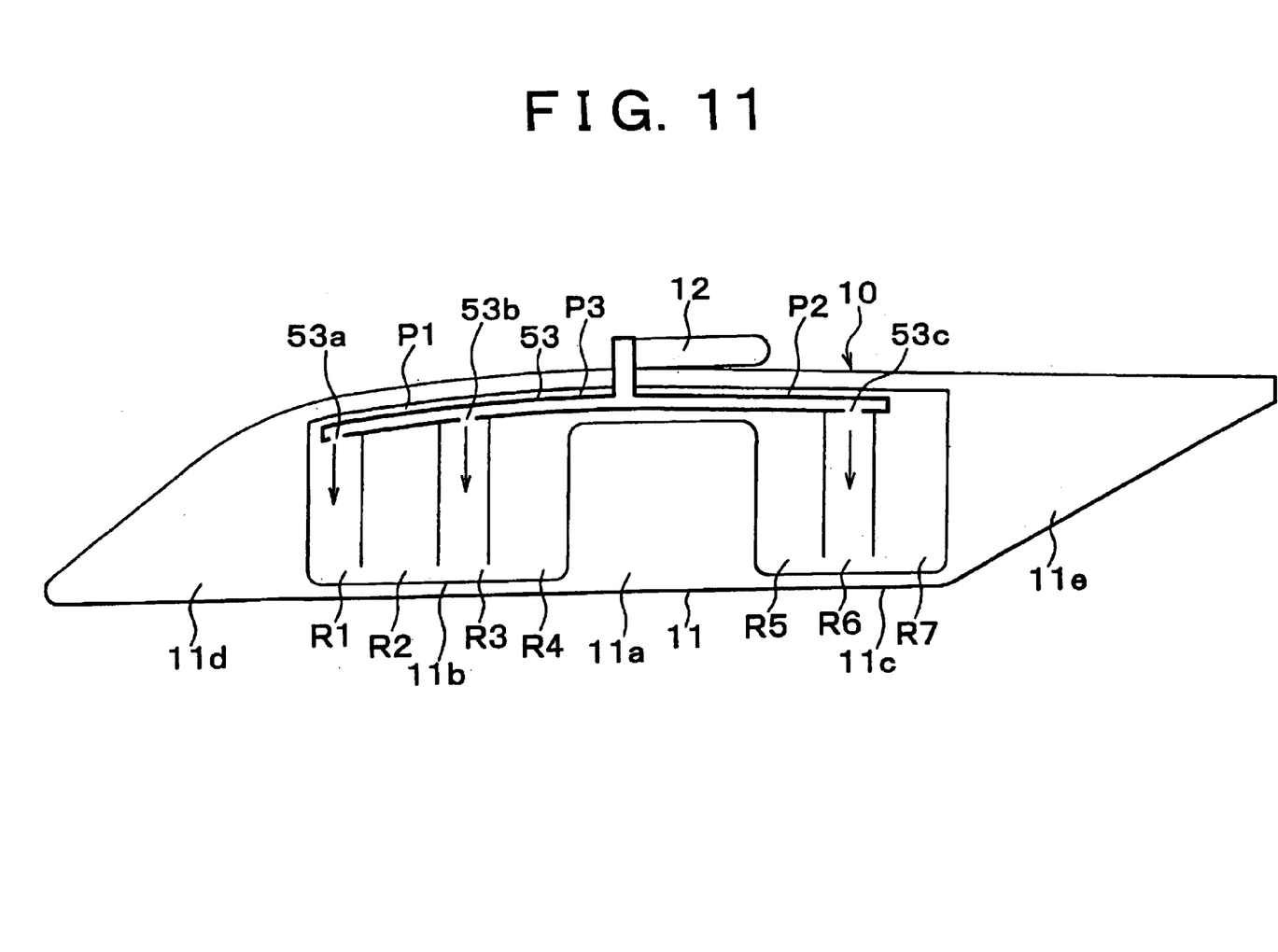
FIG. 11 is an enlarged side view corresponding to FIG. 7, showing the main part of a seventh embodiment of the head-protection airbag device according to the invention.

In the third to sixth embodiments, the inflator 12 is disposed behind the rear-seat inflatable portion 11c of the airbag 11. As in a seventh embodiment of the invention shown in FIG. 11, however, the inflator 12 may be disposed between the front-seat and rear-seat inflatable portions 11b and 11c of the airbag 11. Note that the gas distribution pipe 53 may be eliminated from the seventh embodiment of FIG. 11, as in the case of FIG. 10. In this case, the gas can be rapidly and approximately simultaneously supplied from the inflator 12 into each inflatable portion 11b, 11c of the airbag 11, allowing a reduction in the inflation and deployment time of both inflatable portions 11b, 11c.

What is claimed is:

1. A head-protection airbag device, comprising:

an airbag stored along a roof side rail, and including a gas-introducing path provided at its upper edge and a plurality of inflation chambers, the plurality of inflation chambers comprising direct inflation chambers and indirect inflation chambers;

a gas distribution pipe provided within the gas-introducing path, for introducing into the plurality of inflation chambers a gas supplied from a gas supplier; and a plurality of gas outlets provided in the gas distribution pipe, each gas outlet disposed corresponding to at least one direct inflation chamber;

wherein:

gas is supplied from the gas supplier into the plurality of inflation chambers through the plurality of gas outlets of the gas distribution pipe;

the airbag is inflated and deployed like a curtain along a sidewall of a vehicle compartment so as to protect a head of a seated occupant;

each direct inflation chamber has a smaller volume than each indirect chamber; and each direct inflation chamber is disposed at a location away from a head-rest of an adjacent seat in a fore-and-aft direction of a vehicle.

2. The head-protection airbag device according to claim 1, wherein the airbag protects a head of an occupant seated in a front seat and a head of an occupant seated in a rear seat.

3. The head-protection airbag device according to claim 1, wherein the gas supplier is provided at a rear end of the gas distribution pipe.

4. The head-protection airbag device according to claim 1, wherein the gas supplier is provided at an intermediate position of the gas distribution pipe.

* * * * *